April 25, 1967 W. R. ROACH 3,315,552
TUBE HANDLING APPARATUS
Filed April 27, 1965
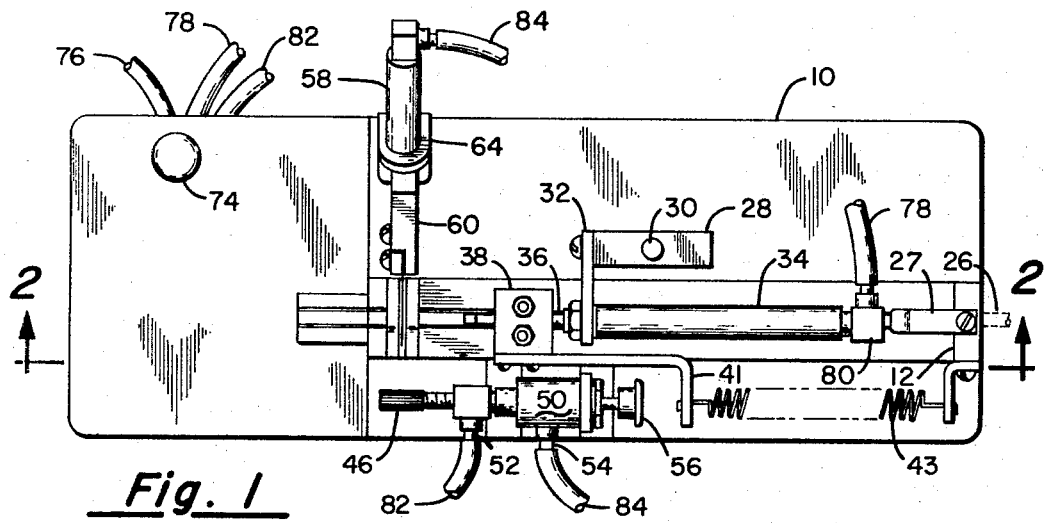
Fig. 1
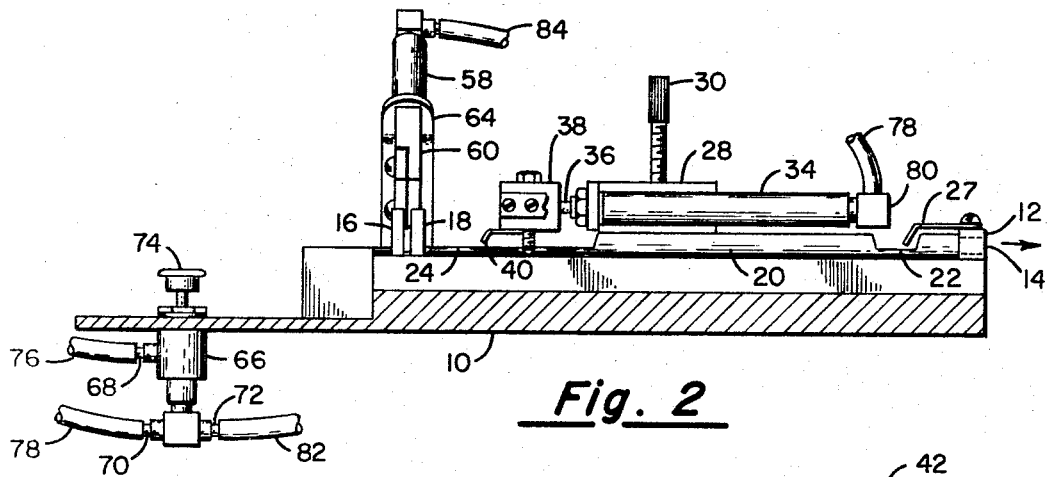
Fig. 2
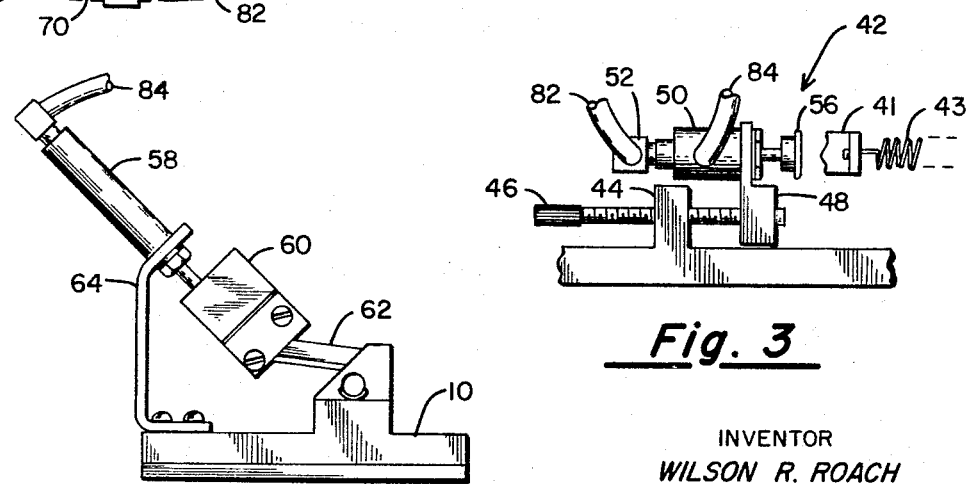
Fig. 3
Fig. 4
INVENTOR
WILSON R. ROACH
BY Joseph A. Speldrich
AGENT United States Patent Office 3,315,552
Patented Apr. 25, 1967

3,315,552
TUBE HANDLING APPARATUS
Wilson R. Roach, St. Paul, Minn., assignor to Sperry Rand Corporation, New York, N.Y., a corporation of Delaware
Filed Apr. 27, 1965, Ser. No. 451,200
6 Claims. (Cl. 83—78)

The present invention is directed to a device for pneumatically feeding, severing, and assembling electrical insulation tubing in sections of predetermined length upon an electrical conductor.

More specifically, the present invention relates to a pneumatically actuated ram device operatively mounting a feeder element supplying continuous lengths of insulation tubing within the apparatus by advancing a predetermined length of the tubing through a guide means area located in operative proximity to a severing element operating in sequence subsequent to tubing feeding operations.

At the present stage of assembling electrical insulation tubing over wire conductors, it has been necessary for an assembler to manually insert the conductor element or wire within the insulation tubing and then sever the tubing in the particular lengths desired. Such prior art technique represents significant time requirements for assembly and therein attendant high cost levels. In those instances where tubing is cut prior to production operations, a large inventory of different diameters of precut tubing is necessitated which is disadvantageous in terms of spatial requirements to accommodate the bulk, difficulty of handling, and labor costs for precutting operations. As a result of the inherent disadvantages of the prior art techniques, the present invention has been devised to overcome the time consuming and highly uneconomical methods of supplying severed sections of tubing material.

Accordingly it is a primary object of the present invention to provide a more economical and improved design for a tube handling apparatus.

It is another primary object of the present invention to provide a tube feeding, severing, and assembling device.

It is another primary object of the present invention to provide a tube feeding, severing and assembling device adjustable to accommodate varying tube lengths and diameters.

It is another important object of the present invention to provide a highly efficient, low cost, reliable, simply constructed, and compact tube feeding, severing, and assembling device.

These and other more detailed objects of the present invention will be more evident by reference to the specification and drawings in which:

FIGURE 1 is a top view of the present invention.
FIGURE 2 is a side view of the present invention taken along line 2—2 of FIGURE 1.
FIGURE 3 is an enlarged view of the valve assembly, illustrated in FIGURE 1.
FIGURE 4 is an end view of the present invention showing only the tube severing structure.

Referring to FIGURES 1 and 2, there is shown a base member 10, at the right end of which base member there is an upstanding projection 12 accommodating a transverse hole 14 therethrough. Nearer an opposite end of the base member there is disposed an upstanding guide means 16 also accommodating a transverse hole 18 therethrough. Extending between the projection 12 and the guide means 16 is a tubing guide or conduit means 20 partially cut down as at 22 and 24 for reasons to be hereinafter explained. The conduit 20 is positioned so as to be aligned with the holes 14 and 18 so as to accommodate tubing 26 therein. The tubing may be supplied in a continuous manner from a supply reel, for example. Conduit 20 may be secured in any suitable manner to the base 10, the projection 12, and to the guide means 16. A spring-like or pawl member 27 is secured to the projection 12 and contacts tubing 26 so as to prevent withdrawal of the tubing in the direction of the arrow under normal operating conditions.

Referring to the invention as illustrated in the figures, an adjustable block means 28, having a screw member 30 cooperating with the base member 10, slides vertically on studs (not shown) secured to the base member. The block 28 is adjusted by turning the screw 30 causing said block member to be adjusted vertically as desired. Secured to the front of the block member 30 is an arm member 32 for mounting a first air cylinder or ram 34 conventional in the art. The air or pneumatic cylinder contains a spring return biased piston or rod 36. Mounted in a suitable manner, such as by screws, at the extremity of the rod 36 is a stop lever mounting member 38 having secured at its bottom side a spring-like feeder element 40 cooperating with the tubing 26 so as to feed it through the guide means 16. As explained above, adjustment of the screw 30, permits adjustment of the feeder element 40 to accommodate larger or smaller diameter tubing as needed. Secured to a lateral side of the member 38 is an L-shaped stop lever 41 functioning in a manner to be described below.

By way of reference to FIGURE 3, there is illustrated in greater detail than in FIGURE 1 a first valve 50 and mount assembly 42. Integral with base member 10 or secured thereto in a suitable manner is a projection 44 accommodating a screw member 46 for adjusting a slider 48 mounting the valve means 50 having an inlet port 52 and an outlet port 54 (see FIG. 1). This assembly permits an adjustment by means of screw 46 to vary the length of tubing sections to be severed. A spring return biased operator rod projecting out of the air valve 50 has mounted at an extremity thereof a stop switch button 56 actuated by the stop lever 41. Upon depression of the button 56 by the stop lever 41, air pressure is directed through the air valve inlet and outlet port means and upon return of the operating rod to its outer extremity by the internal spring, the outlet port is closed off. Inasmuch as the valve assemblies and cylinders utilized are conventional in the art, no further discussion thereof is felt necessary. As can be seen therefore, from the figures, the stop lever 41 in opening and closing the valve, determines free passage of air, for example, through the ports. A spring 43 secured to at one end to the stop lever and at the end to the base member aids in the return of rod 36 to the unextended position.

Cooperating with the guide member 16 is a cutting or severing assembly as illustrated in FIG. 4. A second cylinder 58, like 34, mounts to an extremity of its operator rod a holder 60 securely mounting a replaceable cutting knife or severing element 62. The cylinder 58 is held by any suitable means such as by support member 64 secured to the base member 10 such as by screws, for example. The severing element 62 is aligned so as to project into the guide means 16 to sever the tubing 26 upon completion of the movement of the operator rod in an extended direction.

A second valve means 66 is secured to the base member 10 and contains one inlet port 68 and two outlet ports 70 and 72. The outlet ports are opened by depression of the operator rod button 74.

A supply line 76 from a pressure source (not shown) connects to the inlet port 68. Line 78 (shown broken) extends from outlet port 70 to inlet port 80 means at the extremity of cylinder 34. Line 82 (shown broken) extends from port 72 to inlet port means 52 of valve means 50. Line 84 (shown broken) extends from outlet port means 54 to the inlet of the cylinder 58.

The following description setting forth the operational aspects of the invention coordinates the interrelated functions of the elements.

*Operation*

To operate the present invention, a roll of continuous tubing is fed through the rear of the device so as to project under the feeder element 40 at an opposite end of the tubing guide. The operator adjusts the height of the feeder element so as to accommodate the particular diameter of the insulation tubing to be utilized and adjusts the longitudinal position of the first air wave 50 in accordance with the desired length of tubing to be severed from the continuous roll. After making the adjustments, the operator depresses the second air valve operator button 74 permitting high pressure air (where air is used as the operating medium) to flow along the outlet port lines to the first air cylinder 34 and the first air valve. The operator rod of the air cylinder causes the feeder element to force tubing along the tubing guide into the guide means. The stop lever 41 which is secured to the operator rod mounting member and accordingly moves horizontally therewith then depresses the first air valve thereby operating or actuating button 56 for permitting air pressure to escape through its outlet port to the second air cylinder 58 or ram. Upon reaching the second air cylinder, air pressure moves the operator rod and cutting element so as to sever a predetermined length of tubing.

To effect assembly of the severed tubing upon a conductor, the operator of the present invention disposes a wire conductor means in alignment with a severed section of insulation tubing having a trailing end still within the guide means. Upon depression of the start valve, a second section of tubing is advanced and severed while simultaneously shooting or projecting the first severed section entirely onto the wire conductor, hence the tube dispensing, severing, and assembling process is complete.

As a result the operator may quickly and automatically assemble wire conductors with the insulation covering in a single integrated process.

Although the present invention is pneumatically operated there is no intention to restrict operation of the invention to same. It is evident that hydraulic operation may be utilized as well. Further, the cylinders and valves may be replaced with electrical solenoids or other suitable electrical components providing the desired operations.

It is therefore understood that suitable modifications may be made in the apparatus and method as disclosed provided that such modifications come within the spirit and scope of the appended claims. Having now, therefore, fully illustrated and described my invention, what I claim to be new and desire to protect by Letters Patent is set forth in the appended claims.

What is claimed is:

1. In a device for handling tubing, the device comprising in combination:
   (a) base means mounting at one end thereof a projection and another end thereof a guide means;
   (b) tube receiving means axially aligned with holes in said projection and guide means and extending between said projection and said guide means;
   (c) a first adjustment means operatively connected to said base means, said adjustment means being adjustable normally of said base means with a screw means;
   (d) an arm means secured to said adjustment means, said arm means supporting at an extremity thereof a first actuator means, said actuator means being disposed above and aligned with said tube receiving means;
   (e) a mounting member secured to an extremity of said actuator means and adapted to move therewith;
   (f) a stop lever means secured to said mounting member;
   (g) a spring means secured to said stop lever means and to said projection for returning said stop lever in one position,
   (h) a spring means secured to said projection and projecting through said tubing receiving means for limiting directional movement of the tubing;
   (i) a feeder means secured to an underside of said mounting member, said feeder means contacting said tubing;
   (j) a second adjustment means operatively secured to said base means, and mounting on a movable portion thereof a first valve means having a push rod means disposed in operative alignment with said stop lever means, said valve means containing inlet and outlet port means opened and closed by said valve rod,
   (k) a second actuator means operatively secured to said second base means, a severing element secured to said second actuator means, said severing element projecting into said guide means when extended;
   (l) a second valve means containing an inlet port means and two outlet port means and an actuator rod means, the second valve means having connected thereto:
      (1) an inlet conduit extending from a high pressure source,
      (2) a first outlet conduit extending to another extremity of said first actuator means,
      (3) a second outlet conduit extending to the inlet port of the first valve means;
   (m) said first valve means having further connected thereto:
      (1) a first outlet conduit extending to another extremity of said push rod means causes said first actuator means to feed tubing through said guide means and causes said severing element to sever said tubing when said stop lever means opens the outlet port means on said first valve means.

2. In a tubing feeding, severing, and assembly apparatus, the apparatus comprising in combination: coupling means for coupling to a source of fluid pressure, tube severing means coupled to said coupling means; a tubing feed means coupled to said coupling means and being adjustable for handling variable lengths of tubing to be severed by said tube severing means, said tubing feed means being adjustable to accommodate different diameters of tubing, said tube severing means being operatively associated with said feed means wherein said tube severing means is responsive thereto for severing longitudinal sections of tubing, said tubing feeding means capable of ejecting a previously cut section of tubing over an electrical conductor axially aligned with said cut section.

3. In a tubing dispensing severing and assembling device, the device comprising in combination:
   (a) a base means;
   (b) a tubing guide means supported by said base;
   (c) adjustable feed means including as portions thereof an actuator means and a contact member and a mount therefor, said adjustable feed means being operatively secured to and cooperating with the base means;
   (d) a stop assembly means operatively secured to the base means, said stop assembly means including a movable mount means supporting a first valve means;
   (e) a bridging means operatively extending from said mount to the valve means;
   (f) a severing assembly means secured to the base means and operatively connected to said valve means whereby actuation of said actuator means causes said contact member to advance a predetermined length of tubing and whereby actuation of the valve means by said bridging means causes the severing means to sever a predetermined length of tubing and is capable of forcing a priorly cut length of tubing to be assembled over a conductor means disposed in line with said cut tubing.

4. In a tubing feeding, severing, and assembling device comprising in combination:
   (a) a base means;
   (b) an actuator means for supplying tubing means including as portions thereof,
      (1) a first ram and rod means, a feeder element and stop lever operatively secured to said rod, said ram being supported by an adjustable means for adjusting said actuator means normally of said base means to accommodate different diameters of tubing;
   (c) an adjustable first valve means operatively secured to said base and cooperable with the stop lever;
   (d) a severing assembly means secured to said base means and including as portions thereof,
      (1) a second ram and rod means mounting a cutting element;
   (e) a guide means associated with said base means and operatively aligned with said cutting element and adapted to receive said tubing therethrough in a direction normal to movement of said cutting element;
   (f) a second valve means secured to said base, and tubing means interconnecting all said valve means and rams, whereby actuation of said second valve means effects movement of said first ram and feeder element to feed tubing through said guide means and whereby actuation of said first valve means by the stop lever causes severing of said tubing means, whereby a previously cut section of tubing can be assembled over a conductor means axially aligned with the tubing.

5. The invention of claim 4 wherein said first valve means is adjustably mounted with respect to the base and with respect to said stop lever for permitting tubing lengths to be severed in predetermined lengths.

6. The invention of claim 4 wherein said adjustable means causes said actuator means to selectively raise and lower normally of said base means and thereby raising and lowering said feeder element corresponding to the diameter of said tubing means.

References Cited by the Examiner

UNITED STATES PATENTS

| | | | |
|---|---|---|---|
| 1,901,067 | 3/1933 | Vickers. | |
| 2,397,974 | 4/1946 | Marrow et al. | 83—277 X |
| 2,428,493 | 10/1947 | Haller | 83—247 X |
| 2,632,239 | 3/1953 | Taylor | 29—235 |
| 2,678,722 | 5/1954 | Marsilius | 10—162 |
| 2,686,246 | 8/1954 | Souter | 83—277 |
| 3,079,679 | 3/1963 | Tullis | 29—235 |

WILLIAM W. DYER, Jr., *Primary Examiner.*

J. M. MEISTER, *Assistant Examiner.*